US008965952B1

(12) United States Patent
Shatalin et al.

(10) Patent No.: US 8,965,952 B1
(45) Date of Patent: Feb. 24, 2015

(54) PROCESSING SERVICE REQUESTS OF MULTIPLE TYPES ON A COMMON COMMUNICATION PORT FOR A SERVICE THAT ACCEPTS ONLY ONE TYPE

(75) Inventors: Vladimir Shatalin, Cranbury, NJ (US); Ryan Paul Stewart-Gardiner, Budd Lake, NJ (US); Shankar Kulkarni, Bridgewater, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1019 days.

(21) Appl. No.: 12/564,537

(22) Filed: Sep. 22, 2009

(51) Int. Cl.
*G06F 15/16* (2006.01)

(52) U.S. Cl.
USPC .......................................... 709/203; 709/217

(58) Field of Classification Search
USPC .......................................... 709/203, 228, 246
See application file for complete search history.

(56) References Cited

U.S. PATENT DOCUMENTS

| | | | | |
|---|---|---|---|---|
| 7,702,724 | B1* | 4/2010 | Brydon et al. | 709/203 |
| 7,774,404 | B2* | 8/2010 | Heidasch | 709/201 |
| 7,774,463 | B2* | 8/2010 | Bloching et al. | 709/225 |
| 7,774,831 | B2* | 8/2010 | Kuznetsov et al. | 726/12 |
| 7,797,450 | B2* | 9/2010 | Xie et al. | 709/246 |
| 7,802,007 | B2* | 9/2010 | Reese | 709/232 |
| 7,925,735 | B2* | 4/2011 | Erickson et al. | 709/223 |
| 7,954,107 | B2* | 5/2011 | Mao et al. | 719/310 |
| 8,112,262 | B1* | 2/2012 | Michelsen | 703/13 |
| 2005/0226250 | A1* | 10/2005 | Makayama et al. | 370/395.21 |
| 2008/0140760 | A1* | 6/2008 | Conner et al. | 709/201 |
| 2010/0150169 | A1* | 6/2010 | Brown et al. | 370/466 |
| 2010/0159961 | A1* | 6/2010 | Bowman et al. | 455/466 |

OTHER PUBLICATIONS

A Quick Guide to the Unified Modeling Language (UML), <http:www/csci.csusb.edu/dick/samples/um10.html>, 2007.
Koirala, Shivprasad, "Unified modeling language (UML) interview questions part 2," The Code Project: Your Development Resource, <http://www.codeproject.com/KB/aspnet/SoftArch6.aspx?display=Print>., 2008.
"Lightweight Directory Access Protocol," Wikipedia, <http://en.wikipedia.org/wiki/Lightweight_Directory_Access_Protocol>, 2009.
"Hypertext Transfer Protocol," Wikipedia, <http://wn.wikipedia.org/wiki/Hypertext_Transfer_Protocol>, 2009.
"URIs, Addressability, and the use of HTTP GET and POST," TAG Finding Mar. 21, 2004, <http://www.w3.org/2001/tag/doc/whenToUseGet.html>.
"Methods GET and POST in HTML forms—what's the difference?" Sep. 28, 2003, <http://www.cs.tut.fi/~jkorpela/forms/methods.html>.

(Continued)

*Primary Examiner* — Richard G Keehn

(57) ABSTRACT

Web service requests, received through a common communication port in a server or network device from a variety of client applications, are analyzed to determine whether to convert one communication type request into another type. Any necessary conversions are performed, and converted and unconverted service requests of one type only are routed to a web service application that accepts only a desired communication type as input. In some circumstances, the response to the client application making the original service request is converted back into the communication type initially used although other response formats may be supported.

19 Claims, 5 Drawing Sheets

(56) References Cited

OTHER PUBLICATIONS

IBM—"WebSphere DataPower Integration Appliance X150," Jun. 3, 2009 <http://www-01.ibm.com/software/integration/datapower/xi50/>.

"Enterprise service bus," Wikipedia, <http://www.en.wiki.org/wiki/Enterprise_service_bus>, 2009.

Websphere DataPower XML Integration Application X150, Version 3.7.1, WebGUI Guide, IBM Corp., 2002, 2008.

* cited by examiner

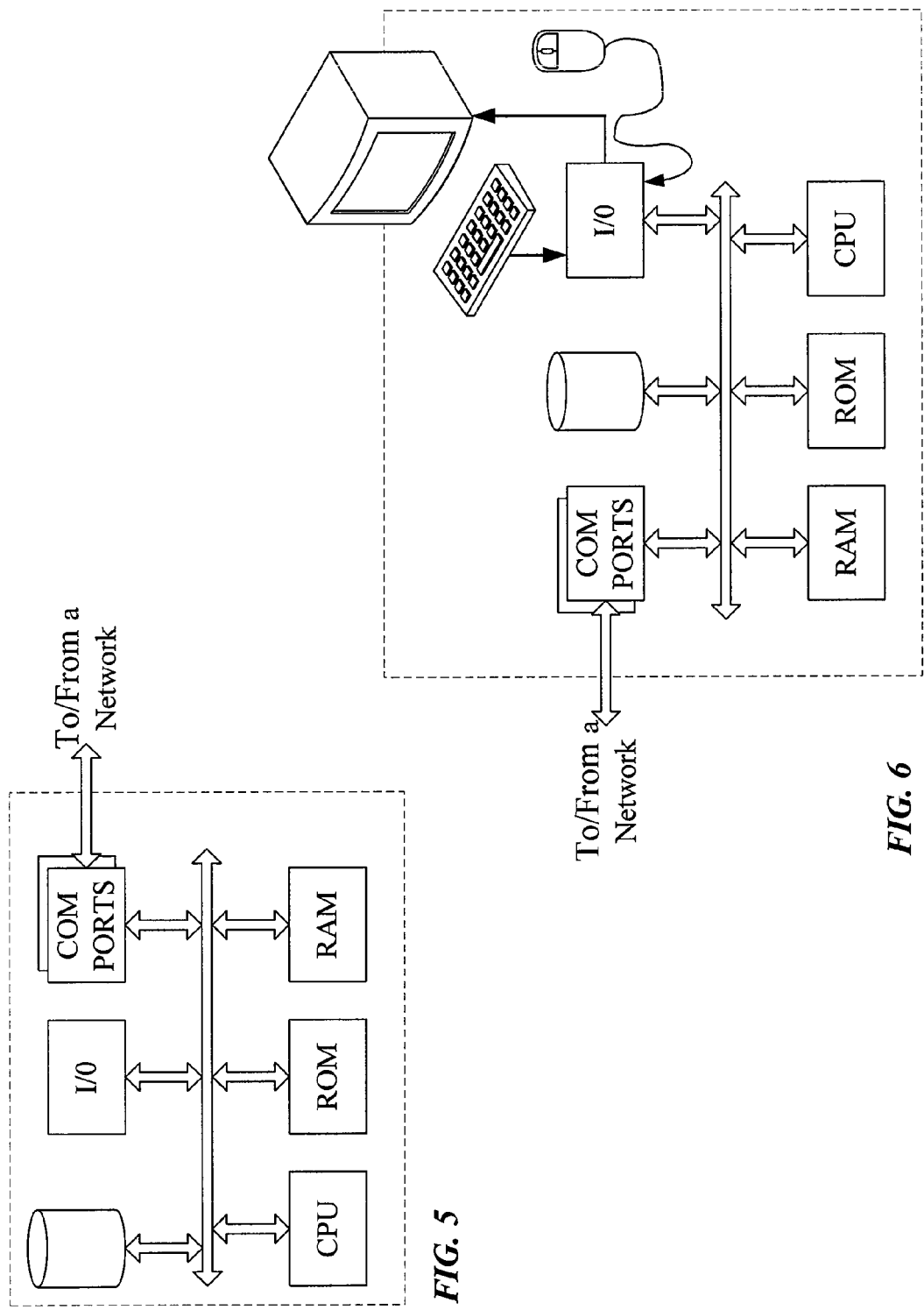

PROCESSING SERVICE REQUESTS OF MULTIPLE TYPES ON A COMMON COMMUNICATION PORT FOR A SERVICE THAT ACCEPTS ONLY ONE TYPE

TECHNICAL FIELD

The present subject matter relates to techniques and equipment to receive service requests through a common communication port in a server or network device from a variety of client applications. If a given service request is determined to utilize a communication type other than a desired communication type, then the service request is converted into the desired communication type. The request is then routed to a web service application that accepts only the desired communication type as input. The web service application then returns a response to the client application, for example, utilizing the communication type that the client application originally used.

BACKGROUND

In recent years, there has been a proliferation of computer software languages that use a variety of manners of communication to interact and exchange data. One manner of communication is client-server communication. In client-server based communication, a client application interacts with a server by first making a service request. The server then remits a response to the client application service using the initial communication type. This request and response interaction facilitates a complete end-to-end communication between client and server systems.

The service request made by the client application may comprise a communication protocol, a protocol method for that communication protocol, and a data format used to submit data over that protocol. For example, a client application may send a service request via the HTTP protocol using the HTTP protocol's POST method and the XML data format. A server would return a response using the same communication type. On the other hand, another client application, could send a service request via the HTTP protocol using the HTTP protocol's GET method and a name-value-pair (NVP) data format. Again, a server would return a response using the same communication type.

The proliferation of computer languages and disparate manners of communication has created interoperability issues amongst different software applications. This is because computer languages and their respective manners of communication may be incompatible with each other.

One contemporary solution to deal with this issue is Service Oriented Architecture (SOA). SOA allows disparate software languages to communicate with each other by providing interoperable services. Each service implements a single task. For example, a client application, using one underlying software language, can make a service request to a SOA service, based on another underlying software language, that returns information about a user's account password. Many other SOA services, each with varying types of information and complexity, are possible. Such SOA services provide a wide range of functionality to outside requesting computer applications.

SOA services achieve interoperability because they accept a single communication standard from client applications. For example, one popular communication standard for SOA is the extensible markup language (XML). XML is a general-purpose specification that allows users to create custom markup languages. Given XML's customizable format, other computer languages utilizing XML can facilitate data exchange amongst one another. This is achieved by defining an agreed upon XML data format that two or more applications are to exchange. The applications can then use that defined format to exchange data. Such a language is ideal for interoperability issues that SOA seeks to solve. A SOA based server could specify that it receives only a given XML based data format. All client applications communicating with that server would need to make service requests using XML data format.

Computer systems that implement SOA also provide a means to discover the services offered. A computer application interacting with the SOA based server can request a list of services that the server provides. The application can then subsequently request that the server perform anyone of those listed services, such as the account password verification service mentioned above. The computer software applications and the services that use SOA based systems to interact are then "loosely coupled" because both remain independent of one another. Loose coupling is preferred when either disparate systems can be changed independently of one another.

A popular implementation of the SOA concept is Web Services. Web Service implementations host SOA based services on a computer server. Web Services also facilitate communication among computer applications via standard internet protocols, e.g., HTTP. The typical communication standard used for software application interaction is the Simple Object Access Protocol (SOAP). SOAP is an XML based specification that that relies on an XML data format for its data payload and can use HTTP for message transmission. Software applications may create SOAP based requests and send them to Web Service Servers for purposes of data exchange. This enables software client applications to make service requests to web service servers in remote locations via the internet. Because of the loose coupling of the underlying SOA scheme, software applications using different computer languages and methods can communicate with each from a distance.

For example, using Web Services, a client application based upon the Java computer language can communicate with a server application based upon the C++ computer language. To send a service request, the Java based client application would create a SOAP message and send it via the HTTP protocol over the internet to the C++ based server application. The C++ application would then implement a Web Services front-end application that would receive the SOAP messages. From the SOAP message the C++ based server application could consume the transmitted data for further processing. The client and server applications could communicate despite their disparate underlying languages, i.e. Java and C++, respectively.

However, Web Services create issues for older, legacy based applications that predate SOA. This is because SOA based architectures, such as Web Services, require the aforementioned single communication standard. For example, with web services, that single communication standard is the SOAP data format sent via the HTTP protocol. Thus, all service requests to a typical Web Service server must be in the SOAP data format. But legacy applications that predate SOA typically use other legacy formats, e.g. HTTP GET with NVP data formats and HTTP POST with XML data formats. This creates issues when Web Service servers do not accept these older formats. Because Web Service based servers generally accept SOAP formatted requests, this creates a communication barrier for legacy applications that use other communication types.

One solution would be to upgrade older client applications and the devices upon which they are implemented. The client applications and devices would be upgraded from their legacy communication types, e.g. HTTP GET with NVP, to facilitate newer SOAP based communication types. Such an upgrade would allow legacy devices to communicate with newer Web Services based servers. As discussed earlier, this would achieve interoperability between devices with underlying disparate languages. However, modification of existing devices could be unduly burdensome or expensive. This is because such modification could require the development of new SOAP enabled software for the client application, the delivery and installation of the software on the client devices upon which the client applications exist, and the cessation of services provided by the client applications while the installation of the software occurs.

For example, and at a high level, consider two different types of client application programs that make service requests to servers using disparate communication types. Each client application is installed on a large number of devices already in use. The server or network device, to which each client application program sends service requests, is newly configured to receive SOAP messages only. In this scenario, a company could modify, or reprogram, the client application programs to use SOAP. This would allow each client application program to communicate with the newly configured server or network device. But, this would not only be burdensome to the stakeholders of the client applications, as they would need to update their respective client application software, but also potentially expensive, as the stakeholders would need to expend time and resources making the modifications to the client application programs.

Alternatively, another solution would be to modify the server or network device to handle each different type of request protocol received from the different client application programs. Such as solution would forgo the need to modify client application programs. That is, the client applications would not need to be upgraded. Instead, client application programs would continue to operate as originally designed. To accomplish this, the stakeholders could place an intermediate communication layer to mediate between disparate client application communication types and Web Service server based applications. Again, this solution would overcome the need to upgrade legacy client applications because the communication from client application to server would be transparent to both entities.

For example, an enterprise service bus (ESB) could act as the intermediate layer placed between the Web Service server and the legacy client application devices. Generally, an ESB refers to a software infrastructure that facilitates the conversion from one communication type to another. ESBs can also route data or other such client-server communications to other endpoints. Said another way, the role of an ESB is to provide a common interface and mediations that handle communication between disparate transport mechanisms, leaving applications to deal only with business logic. In the computer science context, this can be referred to as a "layer of indirection" because the transport mechanisms communicate indirectly through the ESB. The ESB sits between and facilitates communication between both transport mechanisms. An ESB can be implemented as a software only solution—requiring installation on an existing server—or as hardware and software solution—existing as a physical and independent network device with software installed within, e.g. IBM's WebSphere DataPower (WSDP).

In one example, the ESB could receive incoming service requests from the legacy client applications and convert them into SOAP format. The ESB would have its own programmed services, called ESB services, that perform the conversion. By providing an intermediate layer that facilitates the conversion of disparate service requests into the SOAP format required for the Web Service server, the ESB would make the service requests transparent to the Web Service server.

However, an ESB may have limitations of its own. Despite the ability to convert disparate application request types into SOAP format, an ESB may be limited in how it performs this function. For example, ESBs may require each different type of service request to have a different corresponding ESB service. Each ESB service may require a unique communication port be assigned. A communication port is a logical channel or channel endpoint in a communications system at which a server can receive communication requests, e.g. a TCP/IP port. Because of this one-to-one service request type to ESB service limitation, multiple communication ports and multiple corresponding ESB services would have to be used and implemented, respectively, to receive the disparate types of service requests from legacy client applications. This could potentially necessitate an unmanageable or burdensome array of ESB services and corresponding communication ports in order to process disparate service request types received from different client applications. This increase in the number of ESB services and communication ports may cause an increase in the costs associated with the purchase, maintenance and development pertaining to additional server or network devices that house the communication ports and their corresponding ESB services.

For example, as the number of service requests and respective communication types from client applications grow, a company would need to implement more corresponding ESB services. This could create expensive software development costs as ESB services are created and maintained for the purpose of handling each type of service request.

Hence, a need exists for systems and methods that provide a means to reduce the number of servers or network devices and corresponding ESB services required to process client service requests having a variety of communication types.

SUMMARY

One solution to reduce the volume of ESB services required to process client service requests having a variety of communication types is to require that only a single and common communication port is allowed to receive and process different types of client service requests, e.g. HTTP POST and HTTP GET. Requiring only a single port reduces information technology department time/cost, for example, for set-up and maintenance by firewall teams, by application teams, etc. Moreover, such business requirements would also allow client applications to send service requests without having to upgrade their communication type to the server or network device ex ante. As discussed above, this would still make the client application to server interaction transparent.

However, the ESB service corresponding to the single communication port would now have to process all varieties of service requests sent by disparate client applications. Said another way, if all disparate types of service requests were received on a common communication port, the ESB service implemented for that port would need to be able to distinguish and handle each of those service requests accordingly. This creates a problem, since each incoming service request would need to be converted into a desired communication type to allow for further processing by later servers or network devices. Further, in order to facilitate end-to-end communication between client application and servers or network devices, the response to the client application from the server or network device may need to be converted back into the original communication type as well.

Hence a need exists for a method of processing service requests, having a variety of communication types, through a common communication port on a server or network device. Such a method would need to also convert the disparate types of service requests into a common communication type in order to ease maintenance and development on the server or network device, e.g., transforming a HTTP GET service request using NVP data format into a HTTP POST request type using an XML data format. The method would also convert each respective response from a server back into the original communication type to facilitate a complete end-to-end communication type between the client application and the server.

The teachings herein alleviate one or more of the above noted problems with receiving service requests through a common communication port in a server or network device from a variety of client applications. The systems, methods, and articles of manufacture described herein provide for receiving service requests through a common communication port in a server or network device from a variety of client applications, determining whether to convert one communication type into another, performing any necessary conversions, and routing the service requests to a web service application that accepts only a desired communication type as input.

In one configuration, a method for processing service requests, of two different communication types, through a defined protocol, is shown and described. The method includes receiving, in a first server or network device, the service requests from at least one client application, through a common communication port and determining the communication type of the respective service request. If the communication type of the service request is of a communication type other than a desired communication type, then that service request is converted into the desired communication type. The service request is then routed to a second server or network device. A respective response is returned from the first server or network device to the client application making the initial service request. The method can also include converting the response to the client application making the service request back into the communication type used by the initial service request. Further, the method can include converting the service request into a third communication type prior to routing the service request to the further server or network device.

In certain examples, the common communication port through which service requests are received is a Transmission Control Protocol/Internet Protocol (TCP/IP) port. Examples of client applications making the service requests include an Automated Customer Support System (ACSS), an HTTP web server application, e.g. MyBusiness, and an Interactive Voice Response System (IVR), and a Handset Self Serve System (HSS). These exemplary applications use two different communication types. One communication type comprises a Hyper Text Transfer Protocol (HTTP), an HTTP GET method, and the Name-Value-Pair (NVP) data format. The other communication type comprises a Hyper Text Transfer Protocol, an HTTP POST method, and the Extensible Markup Language (XML) data format.

Each of these service requests, whether converted or not, are routed to the aforementioned second server or network device. In one configuration, this server or network device can implement a Service Oriented Architecture (SOA) to handle the incoming service requests. One exemplary implementation of the SOA framework is a web service application, e.g. the Mobile Telephone Activation System (MTAS).

In yet another configuration, an article of manufacture is shown and described. The article includes a machine readable storage medium and executable program instructions embodied in the machine readable storage medium that when executed by a programmable system coupled to a mobile communications network causes the system to perform functions associated with processing service requests, of two different communication types, through a defined protocol. The functions includes receiving, in a first server or network device, the service requests from at least one client application, through a common communication port and determining the communication type of the respective service request. If the communication type of the service request is of a communication type other than a desired communication type, then that service request is converted into the desired communication type. The service request is then routed to a second server or network device. A respective response is returned from the first server or network device to the client application making the initial service request. The functions can also include converting the response to the client application making the service request back into the communication type used by the initial service request. Further, the functions can include converting the service request into a third communication type prior to routing the service request to the aforementioned further server or network device.

As a result, the systems, methods, and articles of manufacture described herein provide for receiving service requests through a common communication port in a server or network device from a variety of client applications, determining whether to convert one communication type into another, performing any necessary conversions, and routing the service requests to a web service application that accepts only a desired communication type as input.

Other concepts relate to unique software to implement functions associated with receiving service requests through a common communication port in a server or network device from a variety of client applications. A software product, in accord with this concept, includes at least one machine-readable medium and information carried by the medium. The information carried by the medium may be executable program code, one or more databases and/or information regarding receiving service requests through a common communication port in a server or network device from a variety of client applications; determining whether to convert one communication type into another, performing any necessary conversions; and routing the service requests to a web service application that accepts only a desired communication type as input.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a simplified functional block diagram of a computer that may be configured as a host, server or other network device.

FIG. 6 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems, methods, and articles of manufacture disclosed herein relate to receiving, through a common communication port, service requests from client applications, determining whether such service requests, and their respective underlying protocol methods and data formats, should be converted into a desired protocol method and data format for further processing, and making the conversion when appropriate. Said another way, the systems, methods, and articles of manufacture described herein allow for a single point-of-entry for receipt, conversion, and transmission of a service request sent by a client application. As discussed below, one or many client applications may send such requests.

Figure 1:
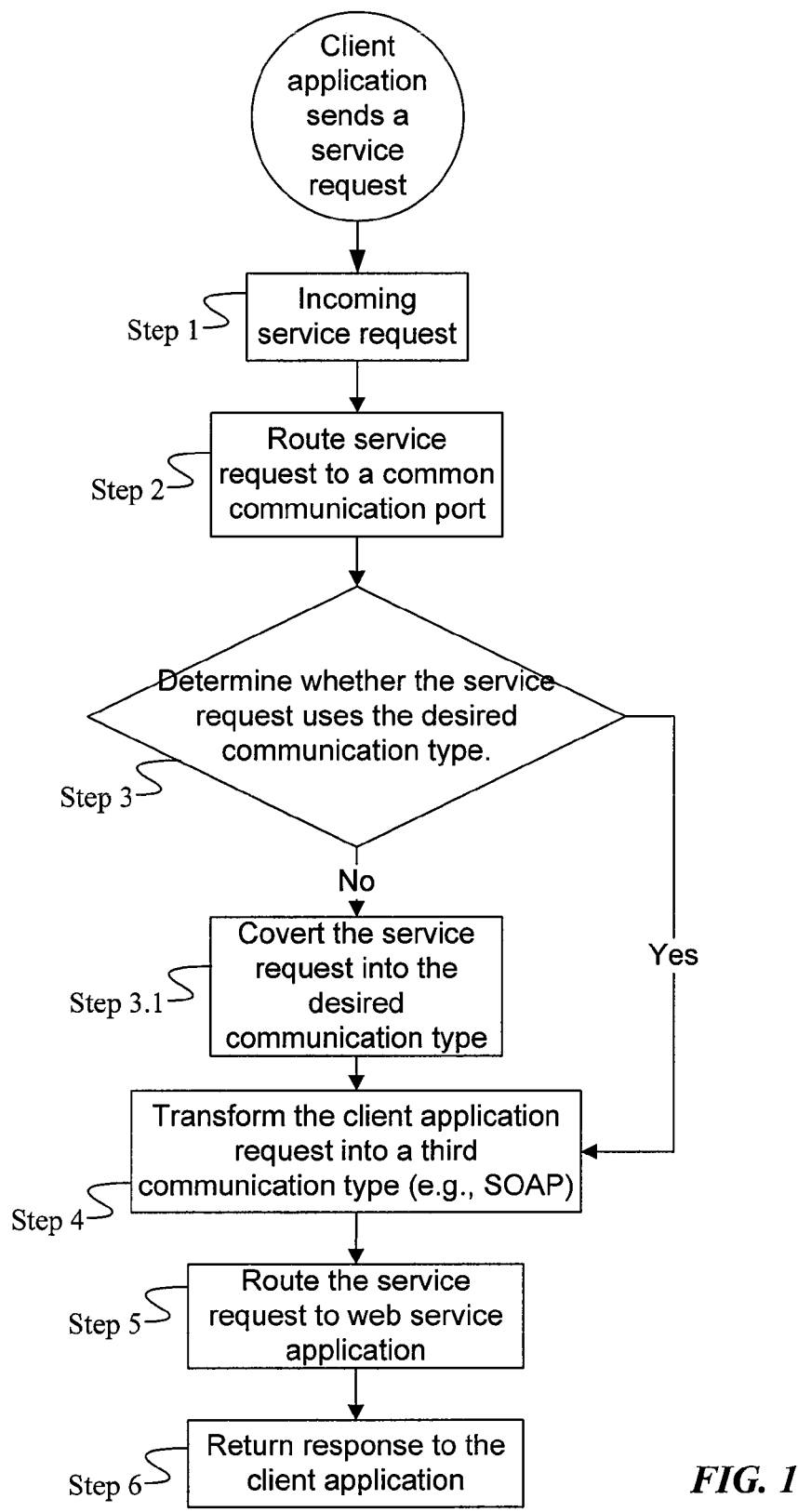
FIG. 1 is a high-level flow chart illustrating a method for receiving a service request on a common communication port and further processing that service request to allow later processing by a web service application.

Reference now is made, in detail, to the examples illustrated in the accompanying drawings and discussed below. At a high level, FIG. 1 illustrates the functionality with respect to a single client application making a single request. A person skilled in the art would recognize that a plurality of client applications could make multiple requests to one or a plurality of servers or other such permutations of client-service interactions.

Step 1—The device or system receives an incoming service request. For example, the service request may be received by an External Load Balancer system. Generally, an External Load Balancer is a computer network or system designed to evenly distribute the incoming service requests to multiple redundant resources, e.g. computer servers or network devices. This would mitigate the possibility of any one resource becoming overburdened with incoming service requests, thus maintaining overall system efficiency and effectiveness.

Step 2—The device or system that recognizes and receives the request, routes the request to a common communication port associated with the same or different system or device. Generally, a port can be any communication interface between computing or other such system devices, e.g., a TCP/IP port.

Step 3—The device or system that receives the service request on a common communication port determines whether the service request is of the desired communication type. If the service request is already of the desired communication type, then the service request is simply routed to Step 4. Communication types can comprise a variety of forms. That is, communication types may use different communication protocols and different protocol methods with different data formats, e.g. HTTP GET and HTTP POST. Other such protocol types and methods and combinations thereof are possible.

Step 3.1—If the device or system that receives the service request on a communication port determines that the service request is not of the desired communication type, then the service request is converted into the desired communication type. For example, a service request sent via the HTTP protocol using the HTTP protocol's GET and the NVP data format could be converted into a service request sent using the HTTP protocol's POST method and XML data format. The request is then routed to Step 4.

Step 4—The request is formatted into a third and common communication format, e.g., SOAP.

Step 5—The request is routed to the same or different computer system or network for further processing. For example, the request could be routed to a web service server, e.g. MTAS.

Step 6—The same or different computer system or network, that receives the request, makes an appropriate response to the client application that initiated the service request. For example, the server could return the account password information as mentioned above. Also, conversion of the response to the initial communication type used by the client application could be necessary.

Figure 2:
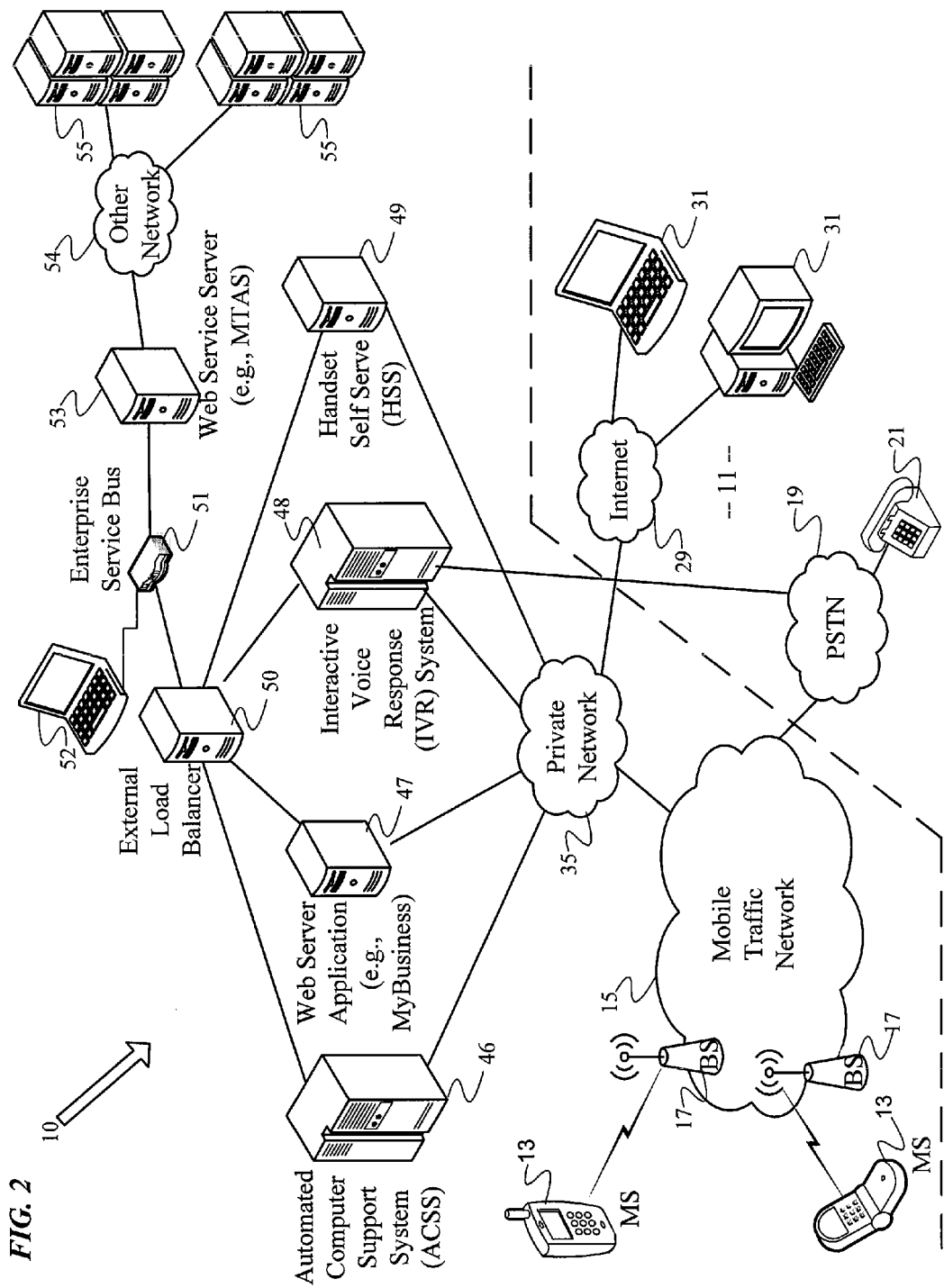
FIG. 2 is a functional block diagram useful in understanding networked elements and systems that may take advantage of the procedure for receiving a service request on a common communication port and further processing that service request to allow later processing by a web service application.

To appreciate the application of the above-discussed technique, it may be helpful to consider the context of an exemplary system of networks and devices offering mobile communication services, as well as the hardware and software of an network equipment, as may be involved in implementing the conversion and routing technique as part of the processing in support of the mobile communication services. FIG. 2 illustrates a number of mobile stations, a mobile communication network coupled to other communication networks and other equipment outside the carrier's network(s) with which the network may communicate. FIG. 2 also illustrates several systems/elements associated with or included in the mobile network for various functions as may be involved in or take advantage of a procedure like that of FIG. 1 for receiving, through a common communication port, service requests from client applications, determining whether such service requests, and their respective underlying protocol methods and data formats, should be converted into a desired protocol method and data format for further processing, and making the conversion when appropriate.

FIG. 2 illustrates a mobile communication network 10 as may be operated by a carrier or service provider to provide a wide range of mobile communication services and ancillary services or features to its subscriber customers and associated mobile station (MS) users. The elements indicated by the reference numeral 10 generally are elements of the network and are operated by or on behalf of the carrier, although the mobile stations typically are sold to the carrier's customers.

The mobile communication network 10 provides communications between mobile stations as well as communications for the mobile stations with networks and stations 11 outside the mobile communication network 10.

Several mobile stations 13 appear in the drawing, to represent examples of the mobile stations that may receive various services via the mobile communication network 10. Today, mobile stations typically take the form portable handsets, smart-phones or personal digital assistants, although they may be implemented in other form factors.

The network 10 allows users of the mobile stations to initiate and receive telephone calls to each other as well as through the public switched telephone network (PSTN) and telephone stations connected thereto. The network 10 allows SMS, EMS, and MMS type messaging between mobile stations and similar messaging with other devices via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13 when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 15, which carries the user communications for the mobile stations 13 between the base stations and other elements with or through which the mobile stations communicate. Other individual elements such as switches and/or routers forming the traffic network 21 are omitted here form simplicity.

The mobile communication network 10 also includes an interactive voice response system ("IVR") 48, that communicates with the other network elements using the various networks shown and described. The IVR system 48 allows a computer to detect keypad inputs from devices such as the mobile station or landline telephone, or to detect the user's voice from a mobile station or other telephone device. IVR system 48 can respond with pre-recorded or dynamically generated audio to further direct users on how to proceed. IVR system 48 can be used to control almost any function where the interface can be broken down into a series of simple menu choices. In some situations, the IVR system 48 uses DTMF signals (entered from the telephone keypad) and natural language speech recognition to interpret the caller's response to voice prompts. Various features of the present disclosure can be implemented using the IVR system 48 and are discussed below in more detail.

A Mobile Directory Number (MDN) is the telephone number assigned to a mobile station, which a calling party or device inputs in order to call or send a message to the particular mobile station. To call the mobile station 13, for example, a user of a PSTN telephone or of another mobile station dials the MDN associated with the mobile station 13. To send a MMS message or a SMS message to destination mobile station 13, as another example, typically entails input of the MDN of that mobile station.

The traffic network portion 15 of the mobile communication network 10 connects to a public switched telephone network 19. This allows the network 10 to provide voice grade call connections between mobile stations and regular telephones connected to the PSTN 19. The drawing shows one such telephone at 21.

The traffic network portion 15 of the mobile communication network 10 connects to a public packet switched data communication network, such as the network commonly referred to as the "Internet" shown at 29. Packet switched communications via the traffic network 15 and the Internet 29 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer (PC) at 31, by way of example.

The carrier will also operate a number of systems that provide ancillary functions in support of the communications services provided through the network 10, and those elements communicate with other nodes or elements of the network 10 via one or more private IP type packet data networks 35 (sometimes referred to as an Intranet), i.e., a private networks. Generally, such systems are part of the private network 35. A person skilled in the art, however, would recognize that systems outside of the private network could serve the same functions as well.

A number of the systems that communicate with, or more specifically, make service requests to, other systems in the private network can be referred to as client applications 46, 47, 48, and 49, which are discussed below. Generally, these client applications reside on server or other computing devices. An exemplary discussion of client applications and associated servers that could exist in the network 10 follows. A person skilled in the art would recognize that other client applications, not depicted in the network 10, are possible.

For example, the Automated Customer Support Service (ACSS) 46 is an application used by customer service representatives to provision and maintain customer account information. Next, MyBusiness 47 is another application, used by customers as a website, accessible via the Internet 29, to view and pay bills, manage accounts and services—e.g. adding and deleting employees to wireless accounts—and access wireless account activity reports including data—e.g. the longest calls made and the most called phone numbers. Further, IVR 48, as discussed above, is an application that facilitates customer interaction via touch-tone or voice based commands. The IVR 48 application can accept such commands from customers and use the commands to interact with other systems in the private network, providing customers with a variety of services and information. Finally, the Handset Self Serve (HSS) 49 is an application that allows customers to manage features and details of their personal wireless accounts from their mobile devices 13. Each of these applications may reside on a number of computers or computing systems although one of each such application and system is depicted in FIG. 2. To user devices, such as a mobile device or a PC, these applications may appear as servers. However, with respect to servers holding data or managing services that these applications need to interact with, these applications function as clients.

As exemplified in FIG. 2, each of these applications 46, 47, 48 and 49 are client applications with respect to the Mobile Telephone Activation System (MTAS) 53. That is, each of these applications has a client-server relationship with the MTAS server 53. MTAS acts as a front end system that provides enterprise services to numerous applications of the mobile network 10. For example, one such service could return information about a user's account password, as mentioned prior. MTAS 53 is implemented as a SOAP based Web Service server 53. It allows applications such as ACSS, IVR, HSS and MyBusiness to be MTAS service users. Theses client applications 46, 47, 48 and 49 use disparate underlying protocol methods and data formats to communicate. An exemplary overview of client-server protocols, protocol methods and associated data formats follows to provide a context for client-server based communication types.

As mentioned, a client-server communication type describes a relationship between two computer programs in which one program, the client application, makes a service request to a second program, the server program, i.e., the server. Generally, both programs are run on separate servers or other computing machines. Thus, the service request is typically made across a computing network, such as the private network in FIG. 2. This makes the client-server communication type ideal for network computing. Examples of network computing include email exchange, web browsing and data access. All of these interactions may be based on a client-server model. Client service requests to the MTAS 53 may relate to account data access or to mobile device provisioning or the like.

The service requests, made by client applications, may comprise a variety of underlying protocols and methods and data formats. A protocol is a set of predefined rules that computers use to communicate across networks. A protocol defines how devices connect, facilitate and transfer data between computing endpoints. For example, HTTP is a widely used protocol for client-server communication and is commonly used with web browser based client applications, e.g. Microsoft's Internet Explorer.

Protocols may have methods associated with them that further delineate how the request is sent by the client application and received and processed by the server. For example, the HTTP protocol has the GET protocol method which may be used to make a service request. Together the HTTP protocol and HTTP protocol GET method can comprise a complete service request. An exemplary HTTP GET request is shown in Example 1, as shown below:

Example 1

GET/website/index.html HTTP/1.0

The Example 1 HTTP GET request is broken down as follows. The entire text of the request is sent across the network to a server. The request is initiated by identifying the server with a uniform resource locator (URL), e.g. www.someserver.com. A URL specifies where a resource, such as a server, is available and the protocol by which to communicate with that resource, e.g. HTTP. A URL can also specify the communication port on which the server is listening for such requests. Persons ordinarily skilled in the art recognize that port 80 is the general default port for HTTP service requests. Once the HTTP GET request is received by the server, the server analyzes the request's text. Example 1's HTTP request instructs the server that the client application is requesting a server file named "index.html" located in the "/website" directory on the server. The request also instructs the server that the client is using HTTP version 1.0, e.g. "HTTP/1.0."

In return, the server will issue a respective response. For example, in response to the HTTP GET request in Example 1, the server could issue the HTTP response of Example 2, as shown below:

Example 2

HTTP/1.0 200 OK
Date: Fri, 6 Jun. 2009 12:12:59
Content-Type: text/html
Content Length: 753
<html>
<body>
<h1>Home Page</h1>
. . .
</body>
</html>

The Example 2 HTTP response is broken down as follows. The server returns the response using the same HTTP version 1.0 as the client application used, e.g. "HTTP/1.0." This allows the server to process and respond to the client using the same version, ensuring a compatible end-to-end communication. The server responds with the status code of "200" meaning that the request succeeded. This is also indicated by the "OK" status. Other such status codes and statuses exist for the HTTP protocol, e.g., "500" for server error. The response also includes header and value pairs that the client application can use to process the response. In Example 2 these include the "Date" header and its respective date value as defined by the server; the "Content-Type" header and its respective value, indicating that the data content in the body of the response is of type "html"—the "index.html" file that was requested; and the "Content Length" header and respective value, indicating that the html body content is "753" bytes of data in size. The body of the response includes the data of the "index.html" file that was requested. In Example 2, this is the portion starting with the "<html>" start tag and ending with the "</html>" closing tag. Typically, this data would be displayed in a web browser. In this example it would be displayed as a bold title reading "Home Page."

In addition to requesting resources and data, the HTTP GET protocol method may be used to send data. Example 3, below, shows how such a request could be made, passing the "field1" name and respective "value1" pair, and "field2" name and respective "value2" pair, as data to a executable script file on the server. These is referred to as the "name value pair" (NVP) data format.

Example 3

GET/website/script.cgi?field1=value1&field2=value2 HTTP/1.0

As in Example 3, this HTTP GET request is initiated by the client making a service request across the network via a URL, e.g. www.someserver.com. The server receives the request and searches for the "script.cgi" resource in the "/website/" directory. Because "script.cgi" is of file type ".cgi," instead of simply returning the contents of the "script.cgi" file, the server executes "script.cgi" passing the name value pairs as query data. The script.cgi can then use the name value pairs for further processing. A response, similar to Example 2, could be returned, but modified so as to express the data provided by the name value pairs, e.g., if "field1=value1" in Example 3, is replaced with "NewPassword=secret," then script.cgi could return html text that renders "Your new password has been changed to: secret" in a web browser.

The HTTP POST method may also be used to send data to accomplish the same task as HTTP GET. Instead of sending data as name value pairs in the URL, HTTP POST differs from HTTP GET by sending data in the body of the request. The data is not shown in the URL as name value pairs. Thus, while both HTTP GET and POST protocol methods can send data for the service requests, each does so using a different data format. Example 4 shows an exemplary HTTP POST request.

Example 4

POST/website/script.cgi HTTP/1.0
Content-Type: application/x-www-form-urlencoded
Content-Length: 15
NewPassword=secret The Example 4 HTTP POST response is broken down as follows. Like the HTTP GET, the HTTP POST request is initiated by the client making a service request across the network via a URL, e.g. www.someserver.com. The server receives the request and searches for the "script.cgi" resource in the "/website/" directory. However, rather than the name value pairs being part of the path request, it is embedded in the content of the request, e.g. "NewPassword=secret." In addition, meta data describes the content of the request. For example, "Content-Type" and its respective value instructs the server that the HTTP POST service request uses the name value pair data structure, e.g. "application/x-www-form-urlencoded". Because it is a POST request, the server understands that the data is in the body of the request and not part of the URL path request. "Content-Length" instructs the server that the content of the request, i.e. in this example "NewPassword=secret," is 15 bytes of data in size.

Unlike the HTTP GET protocol method, the HTTP POST method can send data in a variety of data formats. For example, Example 5 shows the same service request as Example 4, but where the data format of the content of the request uses XML.

Example 5

POST/website/script.cgi HTTP/1.0
Content-Type: text/xml
Content-Length: 15
<?xml version="1.0" encoding="utf-8"?>
<NewPassword>secret</NewPassword>

The request in Example 5 is similar to Example 4 except that the data embedded in the content of the request has been formatted into XML style. Also, the "Content-Type" meta data value has been changed to reflect this, i.e. "text/xml."

These examples show that, even with the HTTP protocol and HTTP methods alone, a variety of service request types are possible. Client applications can use these disparate types of HTTP protocol methods and data formats to achieve the same fundamental service requests and data transmission. This is because each service request can comprise a different underlying mix of protocol, protocol method and data formats as exemplified above. Persons skilled in the art will recognize that even further combinations are possible when considering protocols, protocol methods, and data formats, and other communication mechanisms outside of HTTP.

In FIG. 2, the ACSS 46, MyBusiness 47, IVR 48, and HSS 49 applications exemplify this. Each of these client applications uses one or more of these protocol methods and data format types to communicate with the MTAS Web service. For example, ACSS may make its service requests using the HTTP protocol and HTTP POST method to send data in an XML format. MyBusiness, on the other hand, may make its service requests using the HTTP protocol and HTTP GET method to send data in an NVP format.

As discussed above, this variety of protocol methods and data formats can create interoperability issues for servers that accept limited communication type. For example, the MTAS Web Service server 53 may accept only SOAP data formats over the HTTP protocol. Because client applications 46, 47, 48, and 49 do not use a common communication type, e.g. SOAP, universal availability of existing services is possible only with the introduction of another layer of indirection that will allow the client application and server, which have dissimilar interfaces, to communicate with each other. As discussed above, this layer of indirection can be met via an Enterprise Service Bus.

Generally, the role of an ESB is to provide a common interface and mediations that handle communication between disparate transport mechanisms, leaving applications, such as those communicating with a Web Service server such as MTAS 53, to deal only with business logic. The ESB 51 facilitates the conversion from the variety of protocols, protocol methods and data format types into the requisite type such as SOAP data format and HTTP protocol.

Figure 3:
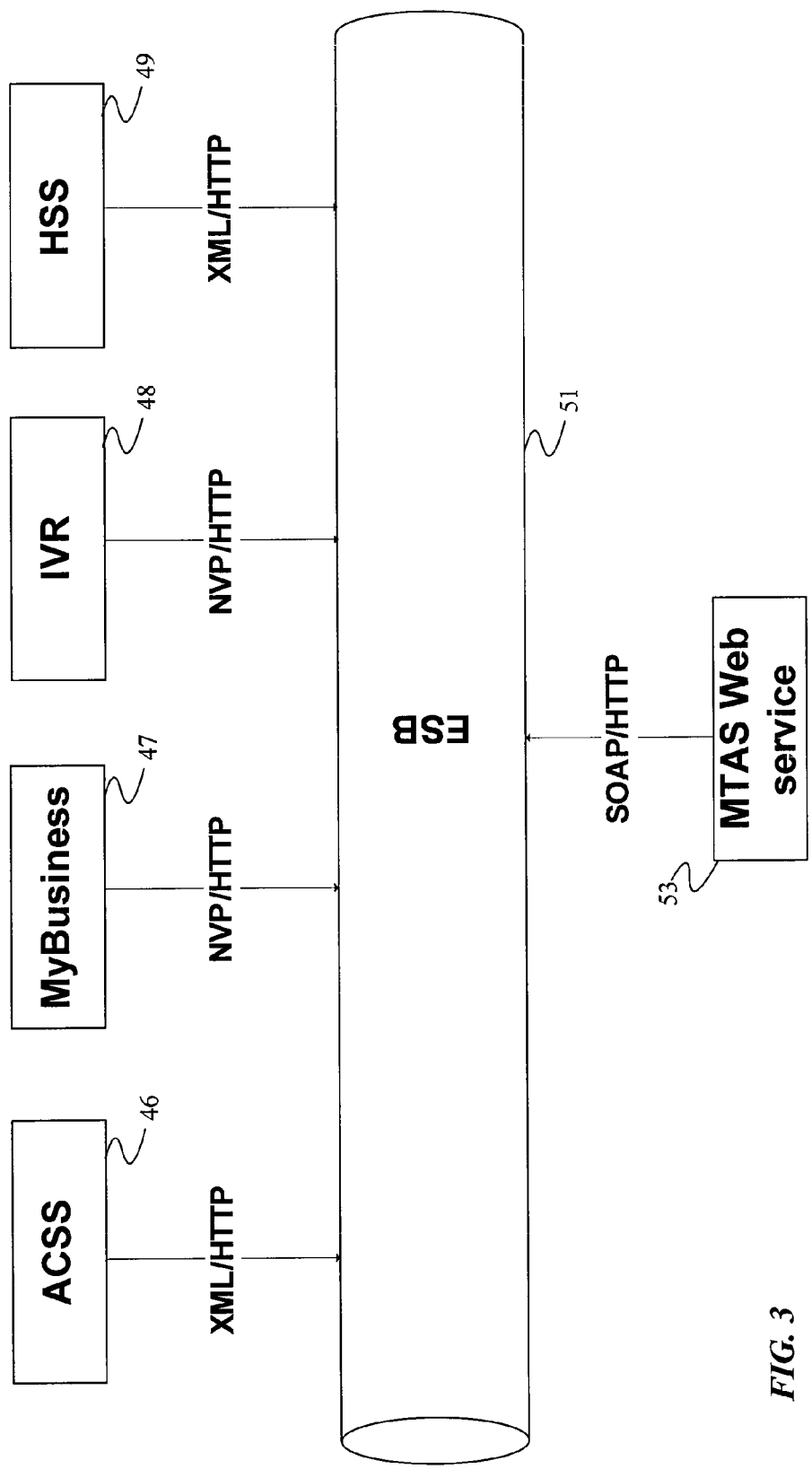
FIG. 3 is a detailed view of an ESB device or implementation of the ESB that acts as a layer of indirection between the client applications and the server and that receives a service request on a common communication port and further processes that service request to allow later processing by a web service application.

FIG. 3 depicts this relationship. FIG. 3 and FIG. 2 show the interaction of the client applications with the ESB 51 and Web Service server 53. As each client application 46, 47, 48 and 49 sends service requests—e.g. ACSS sending XML/HTTP requests and MyBusiness sending NVP/HTTP requests—the ESB 51 facilitates the SOAP/HTTP conversion. ESBs can be implemented as a software only solution or as hardware and software solution. In FIG. 2 the ESB 51 is shown as a hardware and software solution. Though, persons skilled in the art would recognize that the ESB could also be implemented as a software only solution as well.

Figure 4:
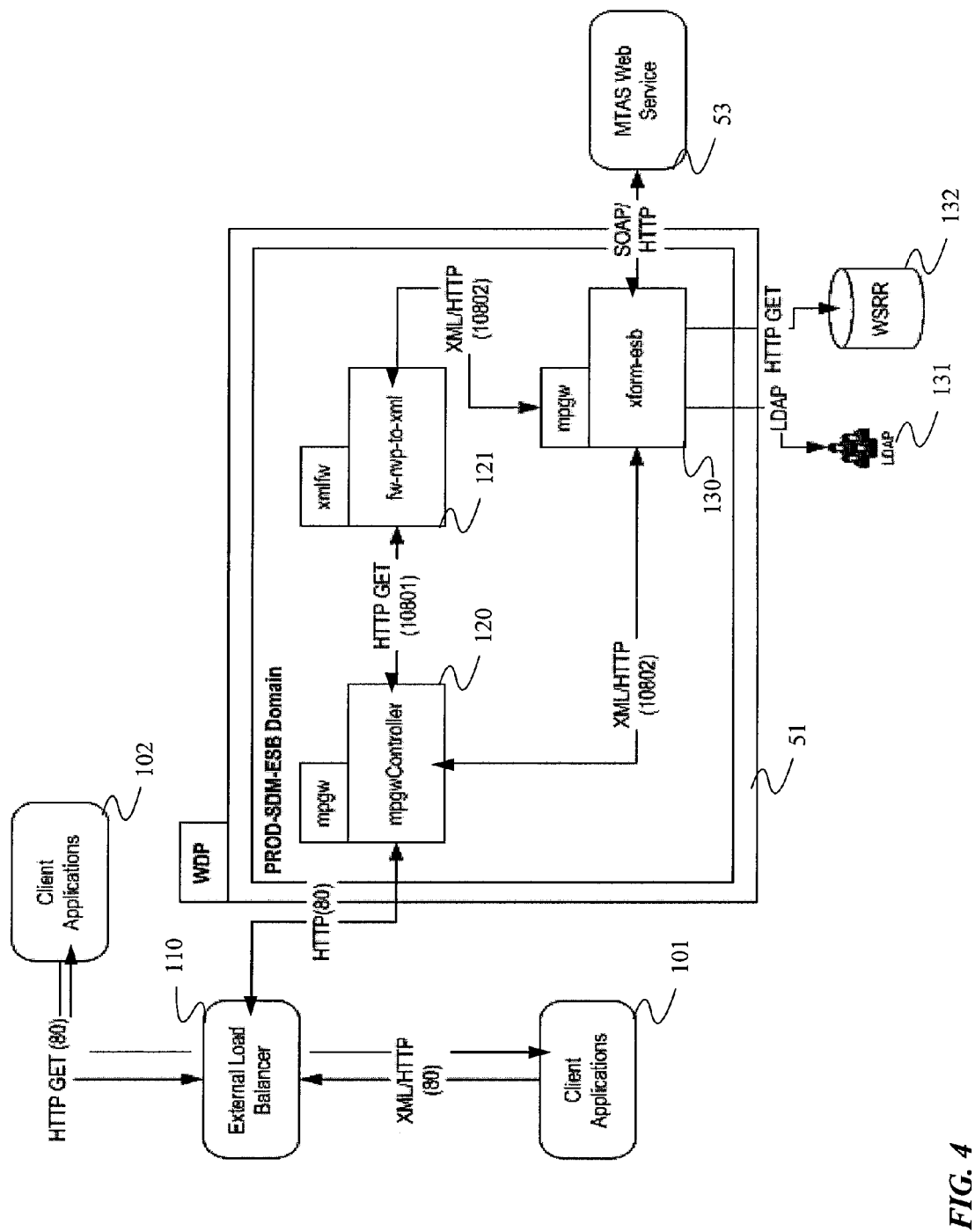
FIG. 4 is a detailed view of an exemplary ESB device and its method of receiving a service request on a common communication port and further processing that service request to allow later processing by a web service application.

However, despite an ESB's ability to convert service requests into the requisite data type such as SOAP/HTTP requests, the ESB 51 may be limited in its ability to perform conversions needed in order to prepare an incoming service request for the final conversion into the SOAP/HTTP state. With reference to FIG. 4 and FIG. 2, exemplary methods used to overcome such limitations are shown and described.

FIG. 4 is depicted as a Detailed Package Diagram. In the Unified Modeling Language (UML), a package is a logical folder or group shown as a rectangular folder and tab. Packages are used for grouping computer software resources, such as ESB services. Generally, an ESB service is a set of programmed instructions implemented on the ESB capable device. In a Detailed Package Diagram interactions between the packages, their corresponding computer software resources, and outside entities—such as client applications—are shown.

In FIG. 4 an ESB device 51 is configured to receive service requests on a common communication port, TCP/IP port 80, from client applications using the HTTP protocol. In this example, the ESB is implemented through a network device, IBM's WebSphere DataPower network appliance (WDP). Although FIG. 4 and FIG. 2 depict one such ESB device 51, a person skilled in the art would recognize that multiple ESB devices may be used. In this example, the ESB device 51 is configured by an external terminal 52 as depicted in FIG. 2. Persons skilled in the art will recognize that other configuration means are possible. Configuration includes, but is not limited to, implementing and naming the ESB services as discussed below and as and as depicted in the PROD-SDM-ESB Domain in FIG. 4.

In one example and as depicted in FIG. 4, WDP is configured to implement the Multi-Protocol Gateway Controller ESB service ("mpgwController") 120. This ESB service is part of the Multi Protocol Gateway package ("mpgw"). The mpgwController 120 determines whether an incoming service request is sent via the HTTP GET protocol method or the HTTP POST protocol method.

WDP is further configured to implement the Name-Value-Pair to XML ESB service ("fw-nvp-to-xml") 121. This ESB service is part of the XML package ("xmlfw"). The fw-nvp-to-xml transforms 121 an NVP data format of the HTTP GET protocol method into an XML data format. For example, Example 6 shows an exemplary HTTP GET protocol method request in its URL form. The data is in the NVP format. The client application making the service request is ACSS 46. Example 7 shows the data transformed into its XML equivalent after being processed by fw-nvp-to-xml 121. Example 7 can also exemplify a direct incoming service request that does not need to be transformed, e.g. directly from an ACSS 46 client application.

Example 6 http://hostname:port/get/NVP?applicationinterface=
  acss&subservicename=vmpchange&customersupplied
  password=12345&
mdn=1112225555&min=1112225555&userid=someuser
  &serviceregion=01

Example 7

<VoicemailServiceRequest xmlns="http://request.xml-beans.mtas.cc.vzw.comNoicemail" xmlns:xsi="http://www.w3.org/2001/XMLSchema-instance">
<applicationinterface>acss</applicationinterface>
<subservicename>vmpchange</subservicename>
<mdn>1112225555</mdn>
<min>1112225555</min>
<cspassword>12345</cspassword>
  <userId>someuser</userId>
  <serviceregion>01</serviceregion>
</VoicemailServiceRequest>

WDP is further configured to implement the Transform ESB Service ("xform-esb") 130. This ESB service is part of the Multi Protocol Gateway package ("mpgw"). Upon receiving the request via the HTTP POST protocol method, the xform-esb 130 performs the following actions. xform-esb 130 determines the type of transaction. It also extracts the identity of the client application, e.g. ACSS. xform-esb 130 receives the service property file associated with the ESB, e.g. the WebSphere Registry and Repository (WSSR) 132, based on the type of transaction. This service property file defines metadata that allows xform-esb 130 to determine how to transact with the Web Service server or servers 53. Properties defined include the URL for the server or other resource to be transacted with; the identity of the Web Service Definition Language (WSDL) file associated with the Web Service server 53; the identity of the request and response XML Schema Definition (XSD) files; the identity of the request and response transformation files, e.g. XSLT files; the identity of the service-specific error-handling transformation file, e.g. another XSLT file; and the identification of the Lightweight Directory Access Protocol (LDAP) 131 groups to which a client application must belong, in order to able allowed access to the Web Service 53.

After the metadata from the service property file is determined, xform-esb 130 performs authorization of the service request, confirming that the client application belongs to at least one of the security related groups required for access to the Web Service server 53. Next, the ESB service validates whether the XML data format is in the correct form by performing an XML schema validation of the service request. Further, the xform-esb 130 transforms the service request into the SOAP data format necessary for communication with the Web Service server 53 or other resource 55 to be transacted with as defined by the URL metadata in the service property file. The format for data portion of the SOAP message is exemplified in Example 8. This data would be sent to the Web Service server 53, for further processing.

Example 8

<?xml version="1.0" encoding="UTF-8"?>
<Verizon>
  <ReqId>CHGPW20081031102828</ReqId>
  <Password>12345</Password>
  <UsrId>someuser</UsrId>
  <Source>ACSSSource</Source>
  <SourceClass>ACSS</SourceClass>
  <TrnType>PWDCHANGE</TrnType>
  <MIN>1112225555</MIN>
  <MDN>1112225555</MDN>
  <Priority>3</Priority>
  <DevType>Voicemail</DevType>
</Verizon>

The xform-esb 130 also receives the response from the Web Service Server 53. xform-esb 130 then validates whether the XML data format of the response is in the correct form by performing an XML schema validation. xform-esb 130 then transforms the HTTP protocol and SOAP data format into the protocol and data format appropriate for end-to-end communication with client application making the initial service request, e.g. HTTP GET or HTTP POST.

An example of a complete end-to-end communication for FIG. 4 follows. A client application 101, such as ACCS 46, sends a service request to an external load balancer 110 on TCP/IP port 80. The service request is sent via the HTTP protocol using the HTTP protocol's POST method. The data format used is XML.

Alternatively, another client application 102, such as a web server application 47, sends a service request to an external load balancer 110 on TCP/IP port 80. The service request is sent via the HTTP protocol using the HTTP protocol's GET method. The data format used is NVP.

The external load balancer 110 routes the service request to a common communication port on the ESB capable device 51. In this example the communication port is a TCP/IP port.

The mpgwController ESB service processes the incoming service request. If the service request is sent by a client application 102 via the HTTP GET protocol method and in the NVP data format, then the service request is routed to the fw-nvp-to-xml ESB service 121. If the service request is sent by a client application 101 via the HTTP POST protocol method and in the XML data format, then the service request is routed to the xform-esb ESB service 130.

If the service request is routed to the fw-nvp-to-xml ESB Service 121, then fw-nvp-to-xml 121 converts the service request's data format from its original NVP data format to the XML data format. fw-nvp-to-xml 121 then performs an HTTP POST protocol method request to route the original service request to the xform-esb ESB service 130. Service requests are routed directly to step 130.xform-esb 130 receives the service request via the HTTP POST protocol method and XML data format. Xform-esb 130 performs the aforementioned security, transformation, and other preparation services. Xform-esb 130 then submits the service request via the HTTP protocol using the SOAP data format to the Web Server service 53. The service request is processed by the Web Service server 53 or other resource 55 defined by the URL meta data. The Web Service server 53 or other resource 55 returns an appropriate response.

xform-esb 130 receives the response. The response is then remitted to each ESB service through which the respective service request originally passed, but in reverse order. For example, if the service request was sent by a client application 102 via the HTTP GET protocol method and in the NVP data format, then the response is routed back to the fw-nvp-to-xml ESB service 121. The response is then routed to the mpgw-Controller ESB service 120. If the service request was sent by a client application 101 via the HTTP POST protocol method and in the XML data format, then the response is routed back to the mpgwController ESB service 120. In either case, the mpgwController 120 then sends the response back to the respective client application.

To summarize FIG. 4, one solution to overcome the limitation, whereby each ESB service expects a unique TCP/IP port to be assigned to it, is to configure a unique service, e.g. the mpgwController 120, to receive and process all incoming service request types on a common port. Adding this new layer of indirection effectively hides the details of the implementation of the service request handling. Said another way, the ESB service contains a front-end controller that receives messages from a client application, analyzes the messages and passes the messages to further services which are responsible for processing HTTP GET or HTTP POST requests. This makes the disparate request types, having various combinations of protocol, protocol method and data format, transparent to a client application.

FIGS. 5 and 6 provide functional block diagram illustrations of general purpose computer hardware platforms, which may be used as the hardware platform(s) for one or more of the network elements (e.g., ACSS 46, MyBusiness 47, IVR 48, HSS 49, External Load Balancer 50, Enterprise Service Bus 51, Web Service server 53). FIG. 5 illustrates a network or host computer platform, as may typically be used to implement a server. FIG. 6 depicts a computer with user interface elements, as may be used to implement a personal computer (PC) or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of receiving service requests through a common communication port in a server or network device from a variety of client applications, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or carrier into the platform of the ESB 51 or other device implementing and ESB or similar functionality. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the ESB 51 implementation described above is embodied in a hardware device, it can also be implemented as a software only solution—e.g., requiring installation on an existing server within FIG. 2.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

ACSS: Automated Customer Support Service
BTS: Base Transceiver System
CD-ROM: Compact Disc-Read-Only Memory
CPU: Central Processing Unit
DTMF: Dual-tone Multi-frequency
DVD: Digital Versatile Disc
DVD-ROM: Digital Versatile Disc-Read-Only Memory
EMS: Enhanced Messaging Service
EPROM: Erasable Programmable Read-Only Memory
ESB: Enterprise Service Bus
FLASH-EPROM: FLASH Erasable Programmable Read-Only Memory
HSS: Handset Self Serve
HTTP: Hyper Text Transfer Protocol
IP: Internet Protocol
IR: infrared
IVR: Interactive Voice Response
LDAP: Lightweight Directory Access Protocol
MDN: Mobile Directory Number
MIN: Mobile Identification Number
MMS: Multimedia Messaging Service
MMSC: Multimedia Messaging Service Center
MS: Mobile Station
MTAS: Mobile Telephone Activation System
NVP: Name-Value-Pair data
PC: Personal Computer
PROM: Programmable Read-Only Memory
PSTN: Public Switched Telephone Network
RAM: Random Access Memory
RAN: Radio Access Network
RF: Radio Frequency
SMS: Short Message Service
SOA: Service Oriented Architecture
SOAP: Simple Object Access Protocol
TCP: Transmission Control Protocol
UML: Uniform Modeling Language
URL: Uniform Resource Locator
WAN: Wide Area Network
WDP: Websphere DataPower network appliance
WSDL: Web Service Definition Language
WSDP: IBM's WebSphere DataPower
WSSR: WebSphere Registry and Repository
XML: Extensible Markup Language
XSD: XML Schema Definition
XSLT: Extensible Stylesheet Language Transformation

What is claimed is:

1. A method comprising steps of;
receiving, by a common service implemented by an Enterprise Service Bus (ESB) of a first server or network device, a first service request for a processing service and a second service request for the processing service from different client applications, the processing service being provided by a second server or network device and the common service receiving the first and second service requests through a common communication port;
determining respective communication types of the received first and second service requests, each communication type comprising a communication protocol, a communication protocol method and a data format;
upon a determination of the first service request being of a first communication type, converting, by a data format converting service implemented by the ESB of the first server or network device, the first service request of the first communication type into a second communication type, the converted service request of the second communication type having a different data format with a different communication protocol or protocol method relative to the first communication type;
routing, via a transformation service implemented by the ESB of the first server or network device, the converted service request to the second server or network device for processing;
upon a determination of the second service request being of the second communication type, routing, via the transformation service, the second service request to the second server or network device for processing;
transforming, by the transformation service, each of the routed converted service request and the routed second service request into a third communication type so as to be compatible with the processing service; and
from the first server or network device, returning, via the common communication port, a response to each client application making the respective first and second service requests based on the processing performed by the second server or network device,
wherein the method further comprises steps of:
receiving, by the data format converting service and from the common service, the first service request through a communication port different from the common communication port; and
receiving, by the transformation service, the routed service requests through a communication port different from the common communication port and the communication port used by the data format converting service.

2. The method of claim 1, wherein the response to the client application making the first service request is converted back into the first communication type initially used by the first service request.

3. The method of claim 1, wherein the third communication type comprises a Hyper Text Transfer Protocol (HTTP), an HTTP POST method, and the Simple Object Access Protocol (SOAP) data format.

4. The method of claim 1, wherein the common communication port is a Transmission Control Protocol/Internet Protocol (TCP/IP) port.

5. The method of claim 1, wherein a client application is an Automated Customer Support System (ACSS).

6. The method of claim 1, wherein a client application is an HTTP web server.

7. The method of claim 1, wherein a client application is an Interactive Voice Response (IVR) System.

8. The method of claim 1, wherein a client application is Handset Self Serve System (HSS).

9. The method of claim 1, wherein the first communication type comprises a Hyper Text Transfer Protocol (HTTP), an HTTP GET method, and the Name-Value-Pair (NVP) data format.

10. The method of claim 1, wherein the second communication type comprises a Hyper Text Transfer Protocol, an HTTP POST method, and the Extensible Markup Language (XML) data format.

11. The method of claim 1, wherein the second server or network device is a Service Oriented Architecture (SOA) based system.

12. The method of claim 11, wherein the SOA based system is a web service server.

13. The method of claim 12, wherein the web service server is the Mobile Telephone Activation System (MTAS).

14. An article of manufacture, comprising:

a tangible non-transitory machine readable storage medium; and executable program instructions embodied in the machine readable storage medium, wherein execution of the program instructions by a programmable system coupled to a communication network causes the system to perform functions for processing service requests, of at least two different communication types, including functions to:

(a) receive, by a common service implemented by an Enterprise Service Bus (ESB) of a first server or network device, a first service request for a processing service and a second service request for the processing service from different client applications, the processing service being provided by a second server or network device and the common service receiving the first and second service requests through a common communication port;

(b) determine the respective communication types of the received first and second service requests, each communication type comprising a communication protocol, a communication protocol method and a data format;

(c) upon a determination of the first service request being of a first communication type, convert, by a data format converting service implemented by the ESB of the first server or network device, the first service request of the first communication type into a second communication type, the converted service request of the second communication type having a different data format with a different communication protocol or protocol method relative to the first communication type;

(d) route, via a transformation service implemented by the ESB of the first server or network device, the converted service request to the second server or network device for processing;

(e) upon a determination of the second service request being of the second communication type, route, via the transformation service, the second service request to the second server or network device for processing;

(f) transform, by the transformation service, each of the routed converted service request and the second service request into a third communication type so as to be compatible with the processing service; and (g) from the first server or network device, return, via the common communication port, a response to each client application making the respective first and second service requests based on the processing performed by the second server or network device, the article of manufacture further comprising instructions for causing the system to perform further functions, including functions to:

receive, by the data format converting service and from the common service, the first service request through a communication port different from the common communication port; and receive, by the transformation service, the routed service requests through a communication port different from the common communication port and the communication port used by the data format converting service.

15. The article of manufacture of claim 14, further comprising instructions for causing the response to the client application making the first service request to be converted back into the first communication type initially used by the first service request.

16. The article of manufacture of claim 14, wherein the second server or network device is a Service Oriented Architecture (SOA) based system.

17. The article of manufacture of claim 16, wherein the SOA based system is a web service server.

18. The article of manufacture of claim 17, wherein the web service server is the Mobile Telephone Activation System (MTAS).

19. A system, comprising:

a first network interface configured to receive service requests for a processing service provided by a server or network device from client applications;

a second network interface configured to deliver the service requests to the processing service;

a processor coupled to the network interfaces;

a common service implemented by an Enterprise Service Bus (ESB) coupled to the first network interface and the processor;

a transformation service implemented by the ESB coupled to the second network interface and the processor; and a data format converting service implemented by the ESB coupled to the processor, wherein:

(a) the common service is configured to:

receive a first service request for the processing service and a second service request for the processing service from different client applications through a common communication port of the first network interface;

determine respective communication types of the received first and second service requests, each communication type comprising a communication protocol, a communication protocol method and a data format;

upon a determination of the first service request being of a first communication type, deliver the first service request to the data format converting service; and upon a determination of the second service request being of a second communication type having a different data format with a different communication protocol or protocol method relative to the first communication type, deliver the second service request to the transformation service;

(b) the data format converting service is configured to:

receive the first service request from the common service;

convert the first service request of the first communication type into the second communication type; and deliver the converted first service request of the second communication type to the transformation service;

(c) the transformation service is configured to:

receive the converted first service request from the data format converting service;

receive the second service request from the common service;

transform each of the converted first service request and the second service request into a third communication type so as to be compatible with the processing service; and deliver the transformed service requests to the processing service via the second network interface; and (d) a response to each client application making the respective first and second service requests based on the processing performed by the processing service is returned from the processing service via the common communication port of the first network interface, and wherein:

the data format converting service is further configured to receive the first service request from the common service through an additional communication port different from the common communication port; and the transformation service is further configured to receive the second service request from the common service and the converted service request from the data format converting service through another communication port different from the common communication port and the additional communication port.

\* \* \* \* \*